(12) United States Patent
Liu et al.

(10) Patent No.: US 6,366,143 B1
(45) Date of Patent: Apr. 2, 2002

(54) POWER SHUT-OFF AND RECOVERY CIRCUIT FOR DATA COMMUNICATION DEVICES

(75) Inventors: Chih-Ming Liu; Chien-Hsin Tsai, both of Taipei Hsien (TW)

(73) Assignee: KYE Systems Corp. (TW)

(*) Notice: Subject to any disclaimer, the term of this patent is extended or adjusted under 35 U.S.C. 154(b) by 0 days.

(21) Appl. No.: 09/088,452

(22) Filed: Jun. 1, 1998

Related U.S. Application Data (63) Continuation-in-part of application No. 09/071,558, filed on May 1, 1998.

(51) Int. Cl.[7] .............................................. H03K 5/19
(52) U.S. Cl. ........................................ 327/142; 327/20
(58) Field of Search ............................ 327/18, 20, 142, 327/198; 370/410, 496; 455/13.4, 38.3, 571, 572, 574, 127, 214, 299

(56) References Cited

U.S. PATENT DOCUMENTS 5,936,442 A * 8/1999 Liu et al. .................... 327/142

* cited by examiner

Primary Examiner—Wellington Chin
Assistant Examiner—Brenda H. Pham
(74) Attorney, Agent, or Firm—Raymond Sun (57) ABSTRACT

A data communication network is provided having a first communication device that includes a plurality of ports, and a control coupled to the ports and having a plurality of outputs extending from the control, with each of the outputs indicative of the status of one of the ports. The network further includes a power shut-off and recovery circuit coupled to the first communication device, and having a first signal detection circuit coupled to the ports for detecting activity on each port and for generating a first signal indicative of the activity, and a second signal detection circuit coupled to the outputs for detecting activity on each port and for generating a second signal indicative of the activity. The power shut-off and recovery circuit further includes a power control circuit that is coupled to the first and second signal detection circuits for receiving the first and second signals, respectively, and for selectively asserting an ENABLE signal based on either the first signal or the second signal. A source transfer circuit is coupled to receive the ENABLE signal for selectively disengaging a power source from the communication device based on the ENABLE signal.

22 Claims, 9 Drawing Sheets

POWER SHUT-OFF AND RECOVERY CIRCUIT FOR DATA COMMUNICATION DEVICES

RELATED APPLICATION

This application is a continuation-in-part of Ser. No. 09/071,558, filed May 1, 1998, entitled "A Power Shut-Off And Recovery Circuit For Data Communication Devices", which is incorporated by this reference as though set forth fully herein.

BACKGROUND OF THE INVENTION

1. Field of the Invention

The present invention relates generally to data communication devices, and in particular, to a power shut-off and recovery circuit for use with data communication devices.

2. Background Art

Computer networks facilitate communication between individuals, businesses, and other entities. Computer networks include communication devices that support the communication of data from a sender to a receiver or data terminal. These communication devices include hubs that join communications lines together in a star configuration, routers that make decisions about which of several paths network traffic (in the form of data packets) will follow, repeaters that copy electrical signals from one Ethernet to another to extend the transmission distance, and bridges that connect two or more networks and forward packets among them.

Figure 1:
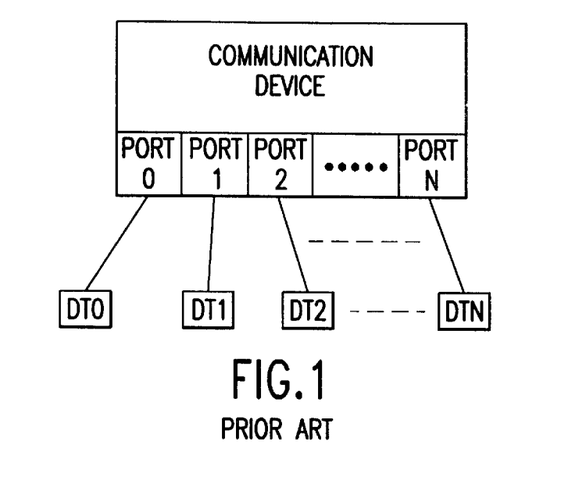
FIG. 1 is a simple block diagram of a conventional network system that includes a communication device and a plurality of data terminals.

FIG. 1 illustrates a conventional network system which includes a communication device, which can be a hub, a repeater, a router or a bridge. The communication device has a plurality of ports PORT0, PORT1, PORT2 . . . PORTN through which communication lines can be connected to a corresponding number of data terminals DT0, DT1, DT2 . . . DTN.

One disadvantage with conventional communication devices is that they are powered twenty-four hours-a-day even though the network is actually in use for only a specific number of hours during the day. In other words, since a communication device is only used when two or more users (i.e., data terminals) communicate via the communication device, the communication device is typically not used except during office hours. Unfortunately, these communication devices do not have any shut-off and recovery mechanism. This leads to two drawbacks. First, by keeping these communication devices on and powered continuously, the maintenance costs (e.g., electricity costs) for these devices increase, and power and energy are unnecessarily wasted. Second, by continuously powering these devices twenty-four hours-a-day, seven days a week, the electronic parts in these devices experience a shorter life than parts in a device that is powered only periodically. In other words, continuous and prolonged operation makes these communication devices more susceptible to damage from over-heating, wear, and device failure.

Thus, there still remains a need for a power shut-off and recovery mechanism for data communication devices so that unnecessary power consumption is curbed, and the life of the communication device is lengthened.

SUMMARY OF THE INVENTION

It is one object of the present invention to provide a power shut-off and recovery circuit that turns off a communication device when a first predetermined condition is met.

It is another object of the present invention to provide a power shut-off and recovery circuit that turns on a communication device when a second predetermined condition is met.

It is a further object of the present invention to provide a power shut-off and recovery circuit that reduces wasteful and unnecessary power consumption by a communication device.

It is yet another object of the present invention to provide a power shut-off and recovery circuit that increases the life of a communication device.

It is yet a further object of the present invention to provide a power shut-off and recovery circuit that does not impact the quality of the communication signals between the communication device and the data terminals.

To accomplish the objectives set forth above, the present invention provides a data communication network having a first communication device that includes a plurality of ports, and a control coupled to the ports and having a plurality of outputs extending from the control, with each of the outputs indicative of the status of one of the ports. The network further includes a power shut-off and recovery circuit coupled to the first communication device, and having a first signal detection circuit coupled to the ports for detecting activity on each port and for generating a first signal indicative of the activity, and a second signal detection circuit coupled to the outputs for detecting activity on each port and for generating a second signal indicative of the activity. The power shut-off and recovery circuit further includes a power control circuit that is coupled to the first and second signal detection circuits for receiving the first and second signals, respectively, and for selectively asserting an ENABLE signal based on either the first signal or the second signal. A source transfer circuit is coupled to receive the ENABLE signal for selectively disengaging a power source from the communication device based on the ENABLE signal.

In operation, the network detects the presence of a communication signal from each of the plurality of ports via the plurality of outputs and the second signal detection circuit, and determines the number of signals received from the outputs. The power supply to the communication device is disengaged if the number of signals received from the outputs is smaller than a predetermined number. Thereafter, the network detects the presence of a communication signal from each of the ports via the first signal detection circuit, and determines the number of signals received from the ports. The power supply to the communication device is reconnected if the number of signals received from the ports is greater than a predetermined number. Thus, when the second signal detection circuit is used to provide the outputs to the power control circuit to indicate the status of the ports, the first signal detection circuit can be turned off, so that the communication signals at the ports are not sampled by the first signal detection circuit. This ensures that the quality of the communication signals will not be compromised by the operation of the power shut-off and recovery circuit.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In certain instances, detailed descriptions of well-known or conventional data processing techniques, hardware devices and circuits are omitted so as to not obscure the description of the present invention with unnecessary detail.

Figure 2:
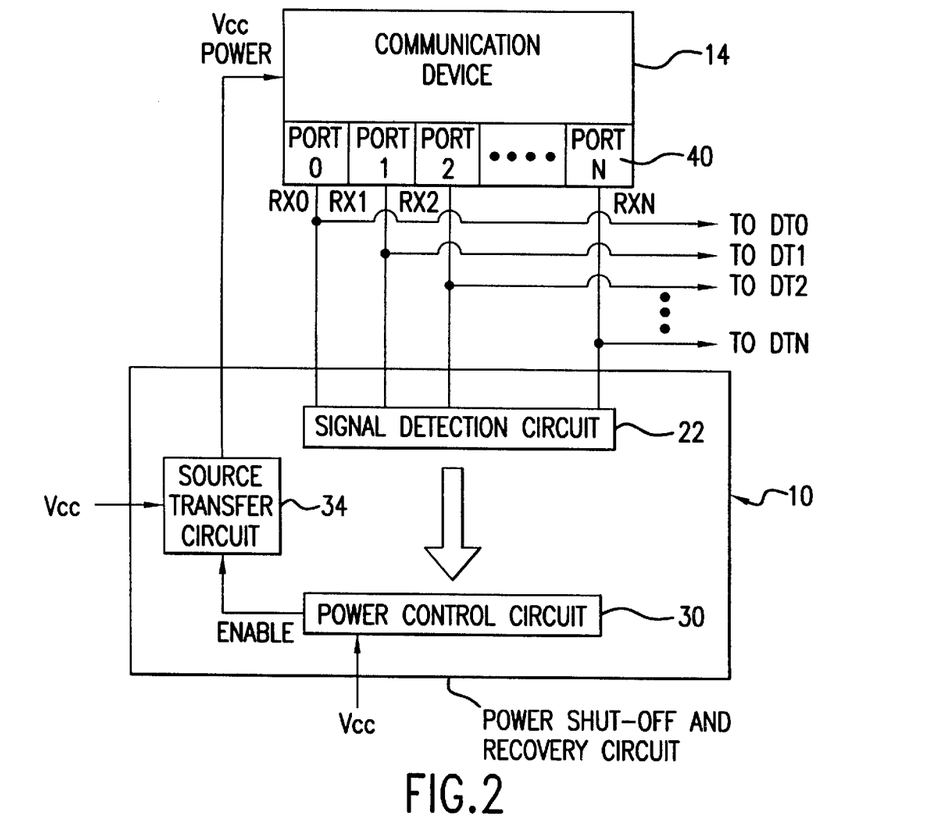
FIG. 2 is a block diagram illustrating how the power shut-off and recovery circuit according to a first embodiment of the present invention is implemented with a network system.

FIG. 2 illustrates a communication network system, such as a local area network (LAN) or similar system, in which one embodiment of the power shut-off and recovery circuit 10 of the present invention can be implemented. The system includes a communication device 14, the power shut-off and recovery circuit 10, and a plurality of data terminals DT0, DT1, DT2 . . . DTN. The communication device 14 has a plurality of ports 40, such as PORT_0, PORT_1, PORT_2, . . . PORT_N through which the corresponding data terminals DT0, DT1, DT2, . . . , DTN can communicate via the transmission and reception of signals, such as RX_0, RX_1, RX_2, . . . , RX_n, that correspond to the correspondingly numbered port 40 and data terminal DT. The communication device 14 can be, but is not limited to, a repeater, router, collecting tray, multiple coupling port installation, or switching hub.

The signals RX are also transmitted to a signal detection circuit 22 in the power shut-off and recovery circuit 10, which functions to detect the presence of signals RX from each port 40, and which provides these signals RX to a power control circuit 30. The power control circuit 30 determines whether there are at least two data terminals DT that are currently communicating via the communication device 14. If there are fewer than two data terminals DT that are currently communicating via the communication device 14, the power control circuit will transmit an ENABLE signal to a source transfer circuit 34 to cut off the power supply Vcc to the communication device 14 to cause the communication device 14 to shut off. The power control circuit 30 is continuously powered, and will periodically detect the presence of signals RX from the ports 40. As a result, once signals RX are detected from at least two ports 40, thereby indicating that two or more data terminals DT are seeking to communicate via the communication device 14, the power control circuit 30 will cause the source transfer circuit 34 to re-connect the power supply Vcc to the communication device 14.

Figure 3:
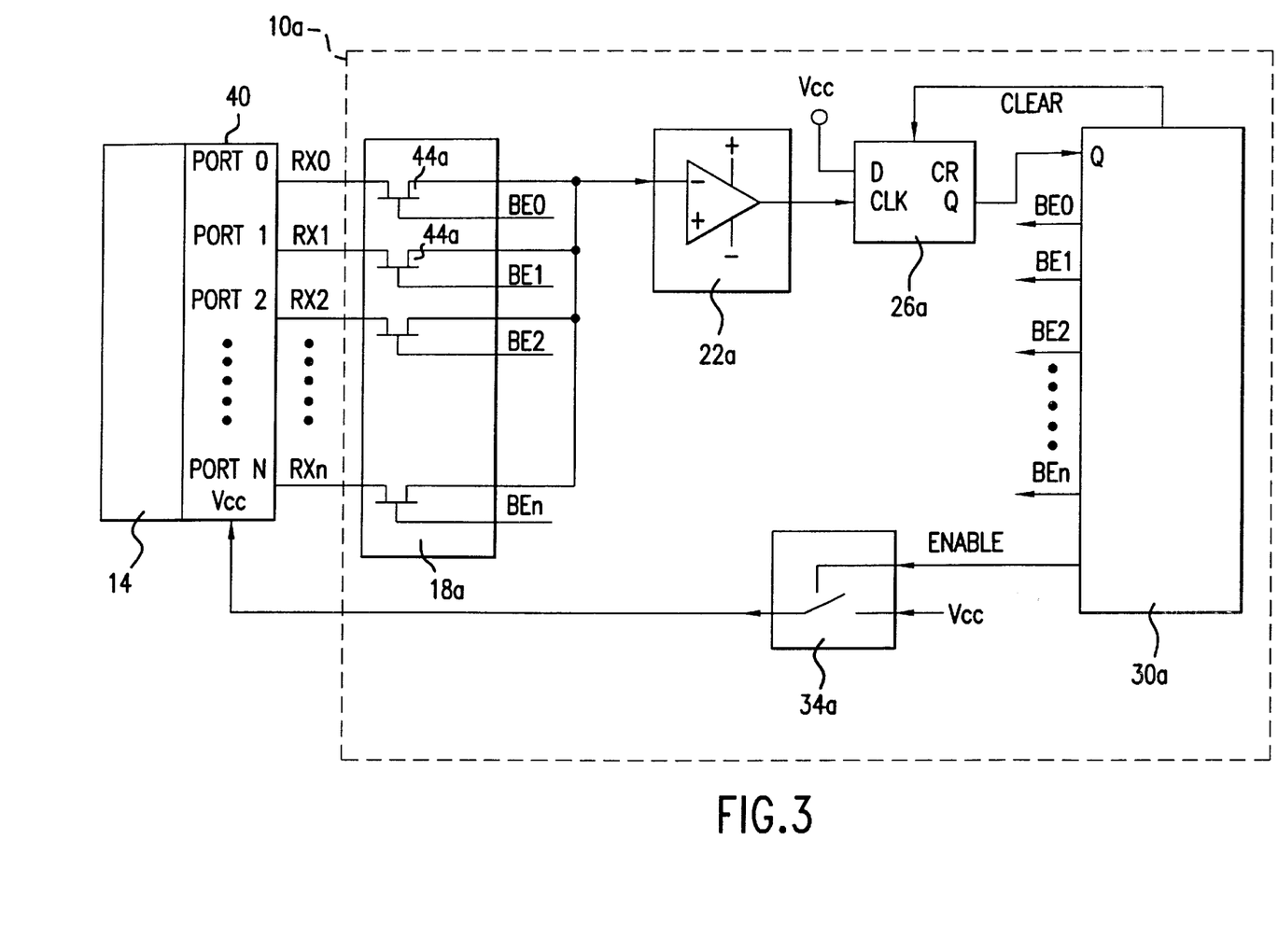
FIG. 3 illustrates one embodiment of the power shut-off and recovery circuit of FIG. 2.

FIG. 3 is a block diagram illustrating a first embodiment of the power shut-off and recovery circuit load according to the embodiment of the present invention illustrated in FIG. 2. In this embodiment, the communication device 14 is a collecting tray, although this is a non-limiting example intended for illustrative purposes only. The shut-off and recovery circuit 10a includes a multiplexer (MUX) 18a, a signal detection circuit 22a, a latch circuit 26a, a power control circuit 30a, and a source transfer circuit 34a. As explained above, the communication device 14 interfaces with the data terminals DT in the network and includes a plurality of ports 40, such as PORT_0, PORT_1, PORT_2, . . . , PORT_N. Each port 40 provides a signal, such as RX_0, RX_1, RX_2, . . . , RX_N, that corresponds to the correspondingly numbered port. These signals RX can represent communication and data signals from the data terminal DT to the communication device 14.

The MUX 18a includes a plurality of pass transistors 44a, with each pass transistor 44a having a drain electrode, a source electrode, and a gate electrode. The gate electrode of each pass transistor 44a receives control signals, such as BE_0, BE_1, . . . , and BE_N, from the power control circuit 30a, which will be described in greater detail hereinafter. Based on the control signal BE, the pass transistor 44a selectively couples the drain electrode to the source electrode. Therefore, only one of the selected signals (BE_0, BE_1, . . . , or BE_N) is active at any one time so that there is only one signal connection on the connection between the MUX 18a and the signal detection circuit 22a.

The signal detection circuit 22a is coupled to the MUX 18a and detects whether a port 40 has an active signal. Each port 40 has an operational mode and an inactive mode. When in the operational mode, the port 40 is receiving active signals RX from the corresponding data terminal DT. When in the inactive mode, the port 40 does not receive any signals RX. When a signal RX is selectively passed through the MUX 18a and is detected, the signal detection circuit 22a generates a pulse at its output and provides the pulse to the latch circuit 26a. When no signal is passed through the MUX 18a, the signal detection circuit 22a remains in a low logic level. The signal detection circuit 22a can be implemented with an amplifier, a comparator, or other similar circuit component.

The latch circuit 26a includes a clock input CLK coupled to the signal detection circuit 22a, a D input coupled to a first predetermined voltage (such as Vcc), a Q output coupled to a Q input of the power control circuit 30a, and a CR input for receiving a CLEAR signal from the power control circuit 30a. Upon receipt of a clock pulse CLK, the output of the latch circuit 26a transitions from a logic-low level to a logic-high signal. The output signal remains at a logic-high level until it is reset by the CLEAR signal. The latch circuit 26a can be implemented, for example, in the form of a D-type flip-flop (with clear), and functions to primarily the receipt of the signals RX from the signal detection circuit 22a.

The power control circuit 30a, which is coupled to the MUX 18a, the latch circuit 26a, and the source transfer circuit 34a, selectively asserts an ENABLE signal based on the number of active ports 40 detected. In other words, the power control circuit 30a determines the operational mode of each of the ports 40 and employs the ENABLE signal to selectively turn the data communication device 14 on or off based on the number of ports 40 that are in the operational mode. As described in greater detail below in connection with FIG. 7, if less than two ports 40 are in the operational mode, the power control circuit 30a automatically de-asserts the ENABLE signal to shut the data communication device 14 off. As explained hereinafter, the ENABLE signal is employed to engage or disengage a power source (e.g., a power voltage signal Vcc) from the collecting tray 14. The power control circuit 30a (and the other power control circuits 30 described below) can be implemented by a programmable logic device, microcontroller, or a controller realized as a monolithic integrated circuit. The power control circuits 30 will include a processor and built-in software that carries out the signal detection, power shut-off and power recovery functions described in greater detail below.

The source transfer circuit 34a selectively connects a power supply voltage, such as Vcc, to the communication device 14 based on the ENABLE signal. In other words, the source transfer circuit 34a selectively engages the power source Vcc to the data communication device 14 in response to the logic level of the ENABLE signal. The source transfer circuit 34a can be implemented in the form of a simple relay operating to turn on or off a connection between the power supply Vcc and the communication device 14. Alternatively, the source transfer circuit 34a can have a power transistor having a gate electrode coupled to the power control circuit 30a for receiving the ENABLE signal, a drain electrode coupled to receive the power voltage Vcc, and a source electrode coupled to the communication device 14.

Figure 4:
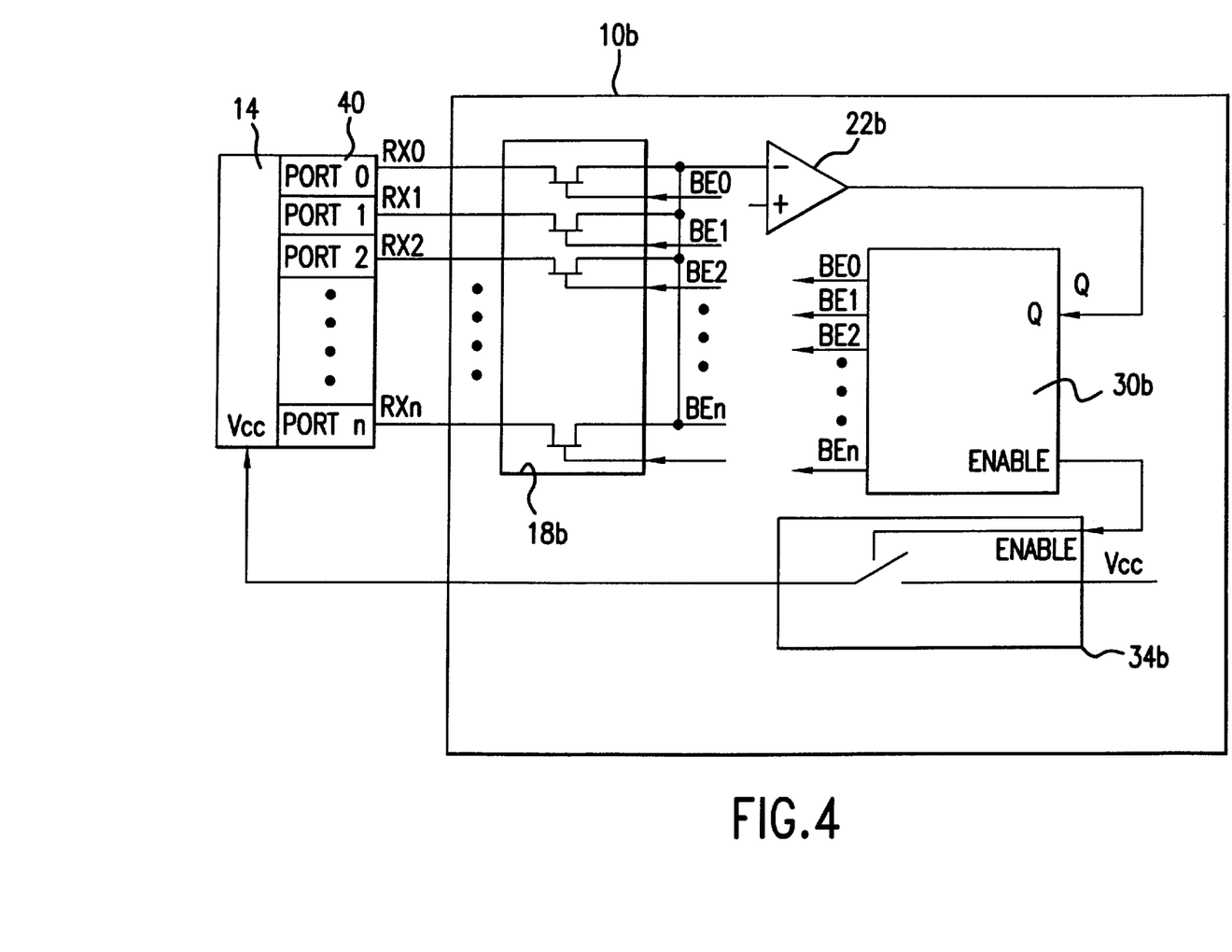
FIG. 4 illustrates another embodiment of the power shut-off and recovery circuit of FIG. 2.

FIG. 4 is a block diagram illustrating a second embodiment of the power shut-off and recovery circuit lob according to the embodiment of the present invention illustrated in FIG. 2. In this embodiment, the power shut-off and recovery circuit lob is essentially the same as that illustrated in FIG. 3, except that the latch 26a has been omitted. As a result, the same numeral designations used for the circuit 10a of FIG. 3 are also used for the circuit 10b of FIG. 4 to represent the same components and elements, except that the designations end in an "a" for the circuit 10a of FIG. 3 and end in a "b" for the circuit 10b of FIG. 4. The latch 26a has been omitted, so that the output of the signal detection circuit 22b is directly connected to the Q input of the power control circuit 30b. The latch 26a can be omitted in cases where the processor of the power control circuit 30 operates at a sufficiently fast speed to receive the incoming signals RX, which are typically received at a fast rate. Otherwise, a latch 26a is needed to latch the incoming signals RX and to synchronize the receipt or input of these signals RX.

Figure 5:
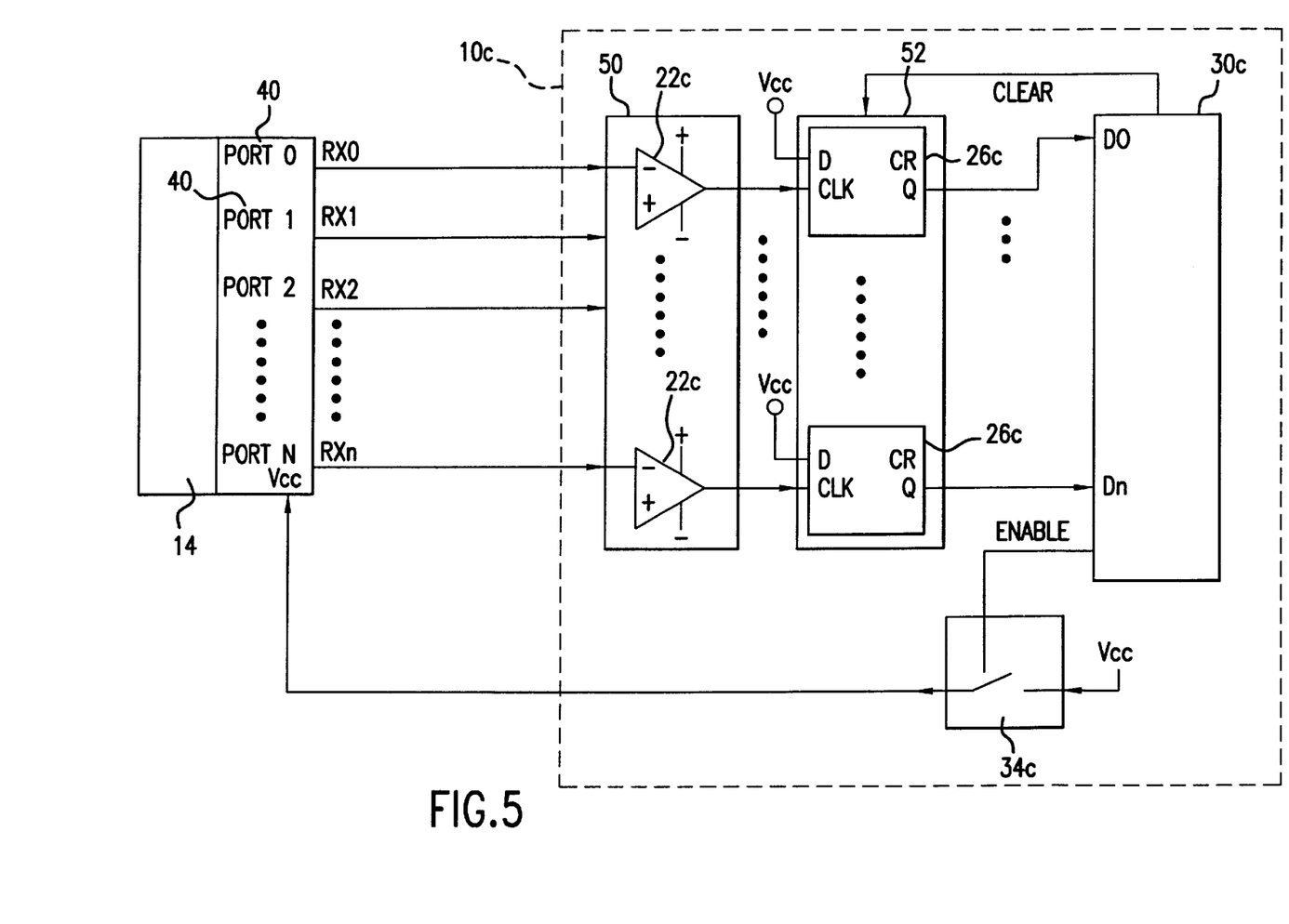
FIG. 5 illustrates yet another embodiment of the power shut-off and recovery circuit of FIG. 2.

FIG. 5 is a block diagram illustrating a third embodiment of the power shut-off and recovery circuit 10c according to the embodiment of the present invention illustrated in FIG. 2. In this embodiment, the communication device 14 is a multiple coupling port installation. The power shut-off and recovery circuit 10c includes a signal detection block 50 having a plurality of signal detection circuits 22c, a latch block 52 having a plurality of latch circuits 26c, a source transfer circuit 34c, and a power control circuit 30c. The communication device 14 includes a plurality of ports 40. Each port 40 is coupled to a corresponding signal detection circuit 22c in block 50, which is in turn coupled to a corresponding latch circuit 26c in block 52. When a signal detection circuit 22c detects activity on the associated port 40, the signal detection circuit 22c generates a pulse and provides the pulse to the corresponding latch circuit 26c. The corresponding latch circuit 26c, in response to the received pulse, asserts an output signal and provides the output signal to a corresponding input D0, . . . , DN of the power control circuit 30c. The power control circuit 30c reads and stores the output signal and then asserts the CLEAR signal to reset the latch circuits 26a. Based on the stored output signals, the power control circuit 30c determines whether to disengage the power source Vcc from the communication device 14 and asserts or deasserts the ENABLE signal. Unlike the first embodiment 10a, which reads and stores the activity of each port 40 in a serial fashion, this embodiment can read and store the activity on each port 40 in a parallel or simultaneous fashion. In other words, the state of the ports 40 can be detected at the same time, instead of one port at a time as in the first embodiment.

The source transfer circuit 34c selectively connects a power supply voltage, such as Vcc, to the communication device 14 based on the logical state of the ENABLE signal provided by the power control circuit 30c, operating in the same manner as source transfer circuit 34a described above.

In comparing the first and third embodiments 10a and 10c, respectively, the first embodiment 10a is less expensive than the third embodiment 10c because fewer signal detection circuits 22 and latches 26 are provided, but the parallel processing of the signals RX in the third embodiment 10c renders it faster than the serial processing of the signals RX in the first embodiment 10a.

Figure 6:
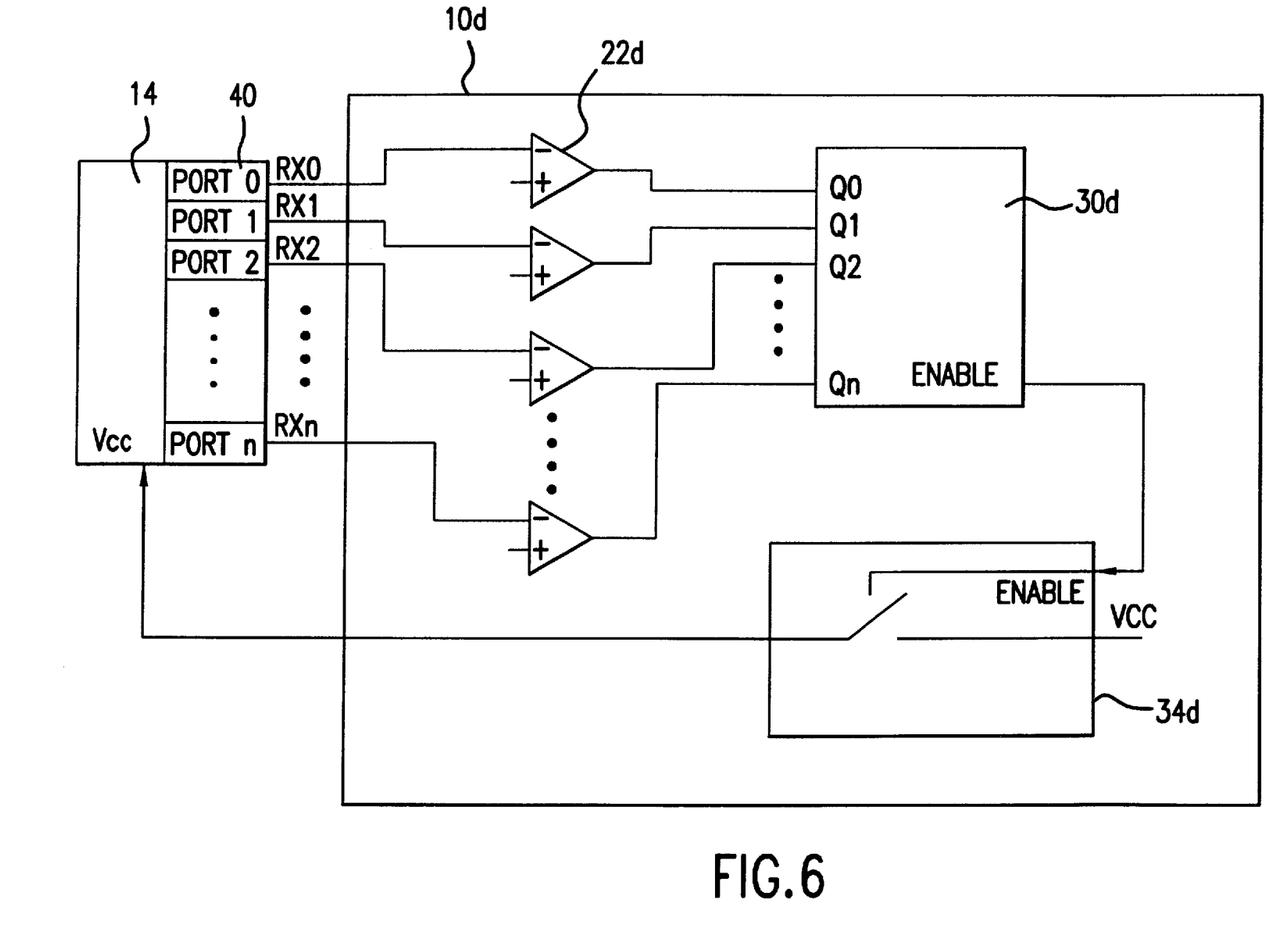
FIG. 6 illustrates a further embodiment of the power shut-off and recovery circuit of FIG. 2.

FIG. 6 is a block diagram illustrating a fourth embodiment of the power shut-off and recovery circuit 10d according to the embodiment of the present invention illustrated in FIG. 2. In this embodiment, the power shut-off and recovery circuit 10d is essentially the same as that illustrated in FIG. 5, except that the latches 26c have been omitted. As a result, the same numeral designations used for the circuit 10c of FIG. 5 are also used for the circuit 10d of FIG. 6 to represent the same components and elements, except that the designations end in an "c" for the circuit 10c of FIG. 5 and end in a "d" for the circuit 10d of FIG. 6. The omission of the latches 26c is based on the same principles explained above in connection with embodiment 10b of FIG. 4.

Figure 7:
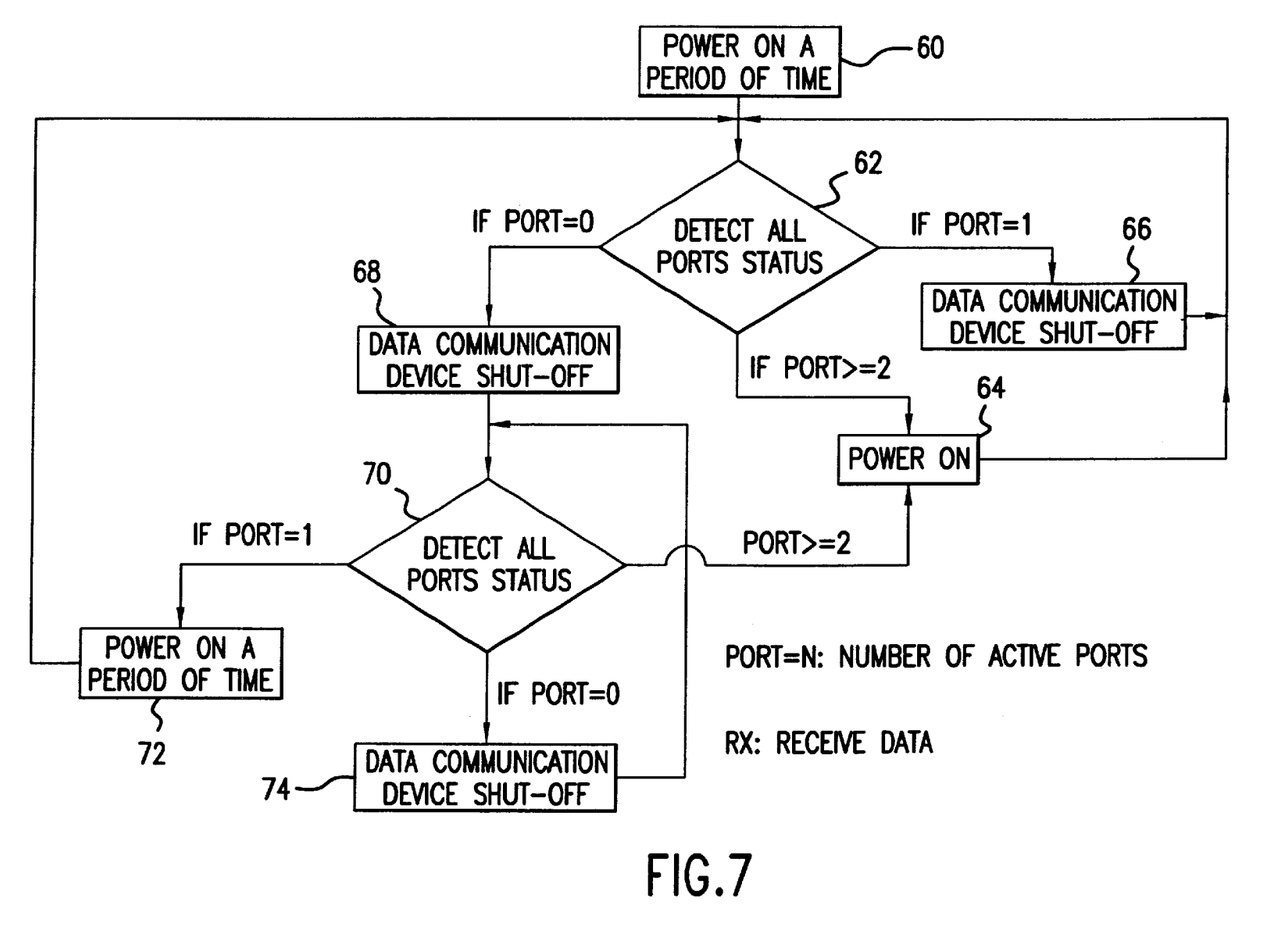
FIG. 7 is a flow-chart illustrating the operation of the power shut-off and recovery circuit of FIG. 2.

The operation of the power shut-off and recovery circuit 10 of FIGS. 2–6 is now described in connection with the flowchart of FIG. 7. The power control circuit 30 in each power shut-off and recovery circuit 10 controls the operation of the circuit 10, and is continuously powered by the voltage source Vcc (see FIG. 2), so it can be programmed to detect the status of the ports, either on a continuous or a periodic basis, and to determine whether the communication device 14 should be turned on or off. Referring to FIG. 7, in step 60, the power control circuit 30 provides power to the communication device 14 to turn it on for a period of time. Thereafter, in step 62, the status of all ports is checked. This step is accomplished in a slightly different manner for the different embodiments. For example, in the first embodiment 10a, the power control circuit 30 will initially assert the signals BE_0, BE_1, . . . , and BE_N, one at a time, starting with BE_0 and ending with BE_N, and provide each BE signal to the respective pass transistor 44a. If the port 40 corresponding to the pass transistor 44a of the BE_0 signal is active, then the signal detection circuit 22a detects the activity and sends a pulse to the clock port of the latch circuit 26a. The latch circuit 26a then generates a logic-high signal and provides the output signal to the power control circuit 30a. The power control circuit 30a reads and stores the received output of the latch circuit 26a, and the power control circuit 30a clears the latch circuit 26a by employing the CLEAR signal. This is repeated for each port 40 until all ports 40 are polled. The second embodiment 10b operates in a similar manner, except that the output of the signal detection circuit 22b is provided directly to the power control circuit 30b.

In the third embodiment 10c, all the signals RX_0, RX_1, ..., RX_N from all the ports 40 are provided in parallel to the corresponding signal detection circuits 22c, each of which detects the activity and sends a pulse to the clock port of the corresponding latch circuit 26c. Each latch circuit 26c then generates a logic-high signal and provides the output signal to the power control circuit 30c. The power control circuit 30c reads and stores the received output of the latch circuits 26c, and the power control circuit 30a clears the latch circuits 26a by employing the CLEAR signal. The fourth embodiment 10d operates in a similar manner, except that the outputs of the signal detection circuits 22d are provided directly and simultaneously to the power control circuit 30d.

After all the ports have been polled, the power control circuit 30 determines the number of ports 40 that are in the operational mode. If it is determined that the number of active ports 40 is two or more, then in step 64, the power control circuit 30 continues to assert the ENABLE signal that causes the source transfer circuit 34 to provide power supply voltage to the communication device 14, and processing returns to step 62 to check the status of the ports 40 again. However, if there is only one port 40 in the operational mode, then in step 66, the power control circuit 30 of the present invention de-asserts (i.e., turns off) the ENABLE signal which causes the source transfer circuit 34 to disengage the communication device 14 from the power source Vcc. Processing returns to step 62 to check the status of the ports 40 again. The status of the ports 40 can be checked again immediately, or after a predetermined time period.

Finally, if none of the ports 40 are in the operational mode, then in step 68, the power control circuit 30 of the present invention de-asserts (i.e., turns off) the ENABLE signal which causes the source transfer circuit 34 to disengage the communication device 14 from the power source Vcc. Processing then proceeds to step 70, in which the status of the ports 40 is checked again, either immediately after a predetermined time period. During this subsequent check, one of three situations will be detected. First, if the number of active ports 40 increases to two or more, then processing proceeds to step 64, where the power control circuit 30 asserts the ENABLE signal to provide power supply voltage Vcc to turn on the communication device 14. Processing then returns to step 62 to check the status of the ports 40 again. Second, if there is now one active port 40, this means that a new user has logged on to the network system, so processing proceeds to step 72, where the power control circuit 30 asserts the ENABLE signal to provide power supply voltage Vcc to turn on the communication device 14 to allow the user to log-in to the network system. Processing then returns to step 62 to check the status of the ports 40 again. Third, if there are still no active ports 40, then in step 74, the power control circuit 30 continues to de-assert (i.e., turns off) the ENABLE signal, and processing returns to step 70 to check the status of the ports 40 again, either immediately or after a predetermined time period.

The embodiments of the power control circuit 10 illustrated in FIGS. 2–6 all poll the ports 40 by using or sampling the RX signals. These RX signals are the actual communication signals between the data terminals DT and the communication device 14. One possible drawback with polling these RX signals is that the quality of these RX signals may be degraded, thereby impacting the quality of the communication between the data terminals DT and the communication device 14. Thus, the present invention provides another embodiment, illustrated in connection with FIGS. 8–10 below, which addresses this potential concern. Since the embodiment illustrated in FIGS. 8–10 contains similar components as the embodiment illustrated in FIGS. 2 and 3, the same numeral designations used in FIGS. 2 and 3 are also used in FIGS. 8 and 9 to represent the same components and elements, except that the designations end in an "a" for the embodiment of FIGS. 2 and 3, and end in an "e" for the embodiment of FIGS. 8 and 9.

Figure 8:
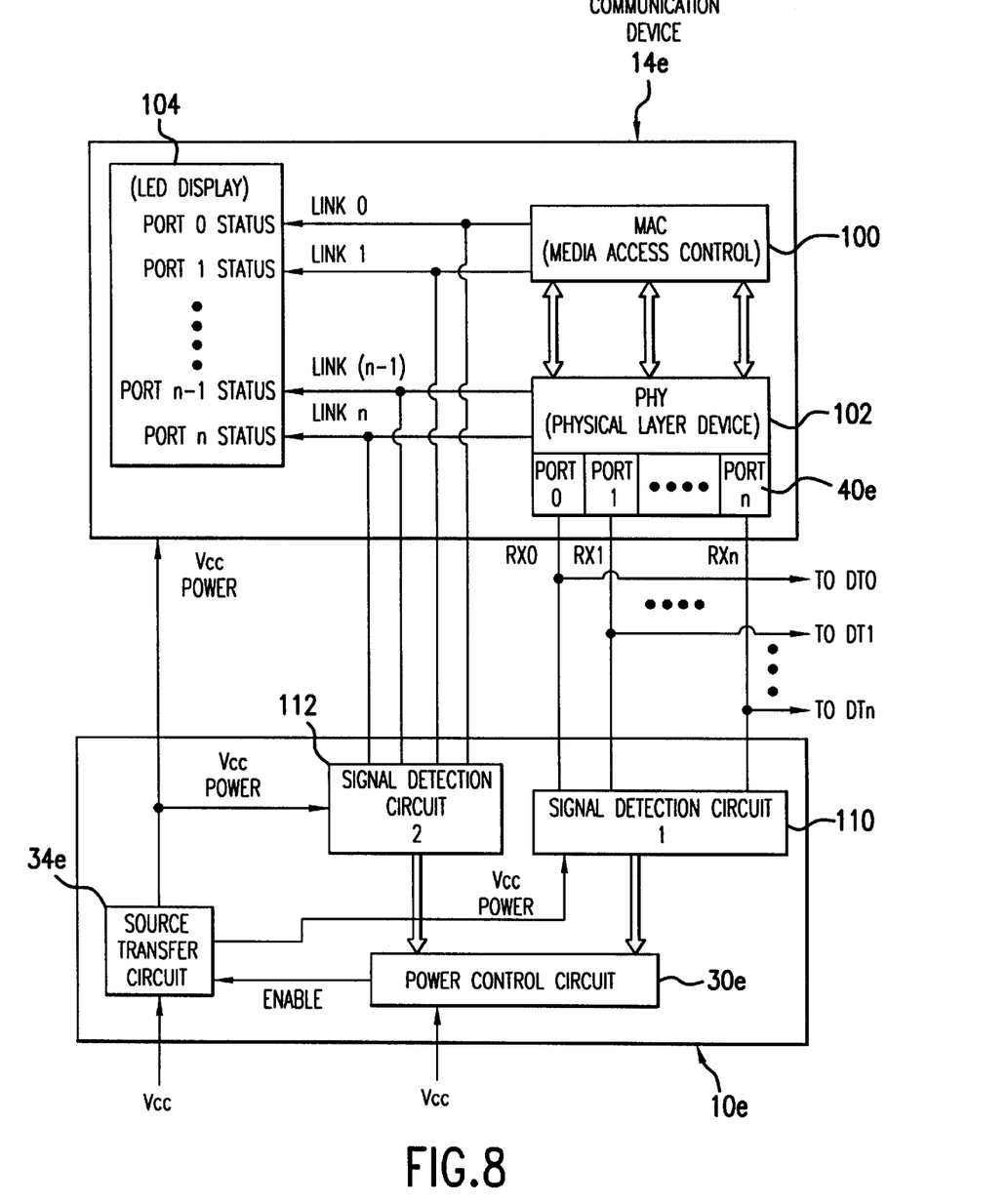
FIG. 8 is a block diagram illustrating how the power shut-off and recovery circuit according to a second embodiment of the present invention is implemented with a network system.
Figure 9:
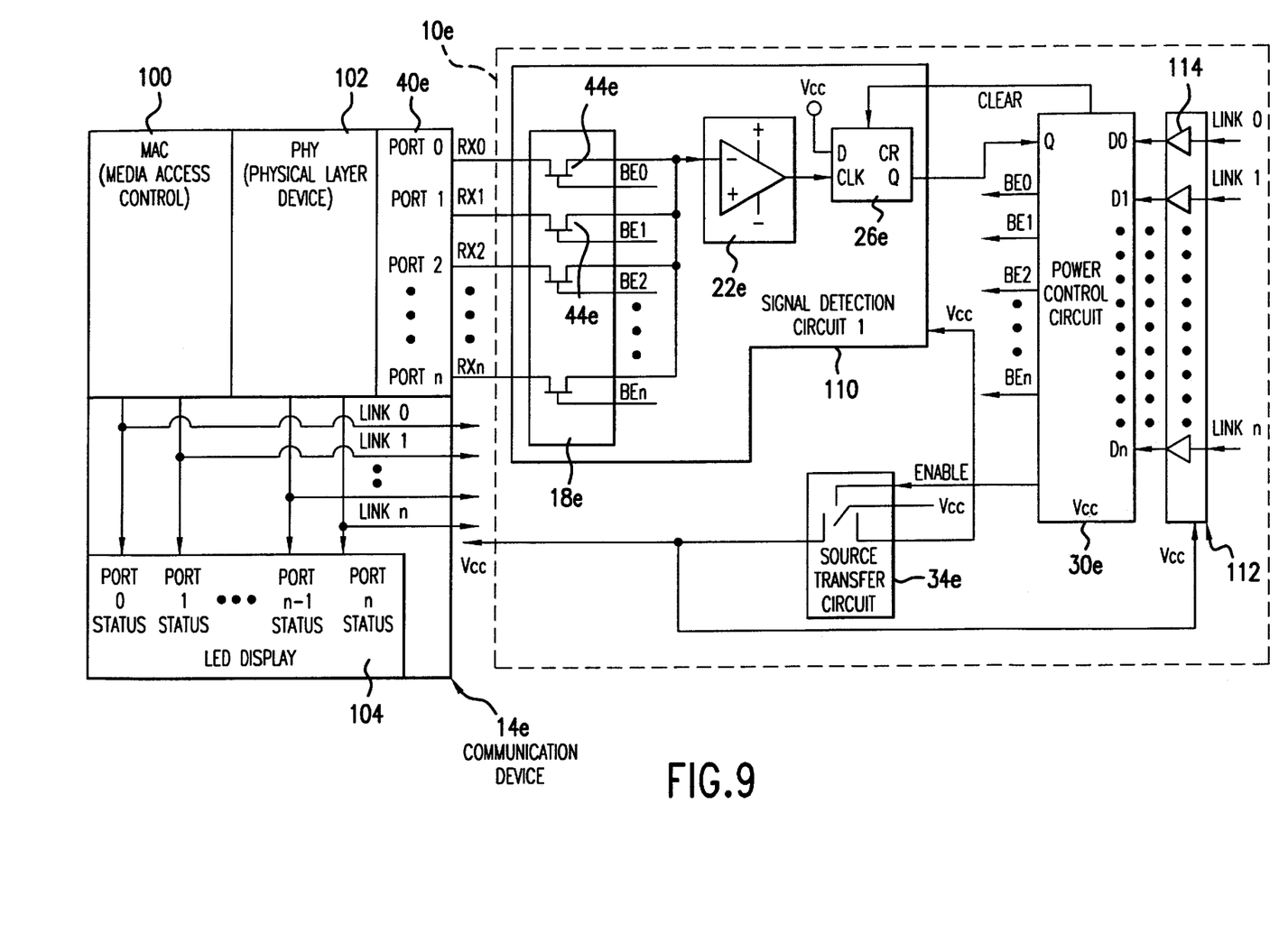
FIG. 9 is a block diagram illustrating in greater detail the power shut-off and recovery circuit of FIG. 8.

Referring to FIGS. 8 and 9, the alternate embodiment of the present invention provides a communication device 14e that includes a media access control (MAC) 100, a physical layer device (PHY) 102 and a display 104. The PHY 102 is coupled to the ports 40e and functions to transmit, receive and manage the communication signals (also known as data signals) that are received from and transmitted to the data terminals DT. The MAC 100 is a data link sublayer that is responsible for processing the data signals, and for transferring or routing these data signals to and from the desired ports 40e via the PHY 104. A plurality of link signals LINK0, LINK1, ..., LINKn are coupled between the MAC 100 and the PHY 102, on the one hand, and the display 104, on the other hand. The display 104 can be an LED display that displays the status of each port 40e based on the LINK signal that is received. The LINK signals can be provided from only the MAC 100 to the display 104, from only the PHY 102 to the display 104, or can be mapped from both the MAC 100 and the PHY 102 to the display 104 (as shown in FIG. 8).

The power shut-off and recovery circuit 10e includes a first signal detection circuit 110 that can be the same as any of the signal detection circuits illustrated in FIGS. 3–6. In addition, the power shut-off and recovery circuit 10e includes a power control circuit 30e and a source transfer circuit 34e that can also be the same the power control circuit 30a and the source transfer circuit 34a illustrated in FIG. 3. However, the power shut-off and recovery circuit 10e additionally includes a second signal detection circuit 112 that is coupled between the LINK signal outputs from the MAC 100 and PHY 102 and the power control circuit 30e. The second signal detection circuit 112 can be implemented in the form of a plurality of latches 114 or buffers, with one latch 114 or buffer for each LINK signal. The outputs of these latches 114 are coupled to corresponding inputs in the power control circuit 30e. In addition, the source transfer circuit 34e has outputs coupled to the first signal detection circuit 110 and the second signal detection circuit 112 to allow the source transfer circuit 34e to selectively turn the first signal detection circuit 110 and the second signal detection circuit 112 on or off based on the status of the ENABLE signal. The output of the source transfer circuit 34e is coupled to the components of the first signal detection circuit 110 and the second signal detection circuit 112, so that each of these components can be directly turned on or off. An alternative method of turning off the first signal detection circuit 110 would be to cause the power control circuit 30e to not generate the BE signals, so that the pass transistors 44e in the MUX 18e are not activated.

Figure 10:
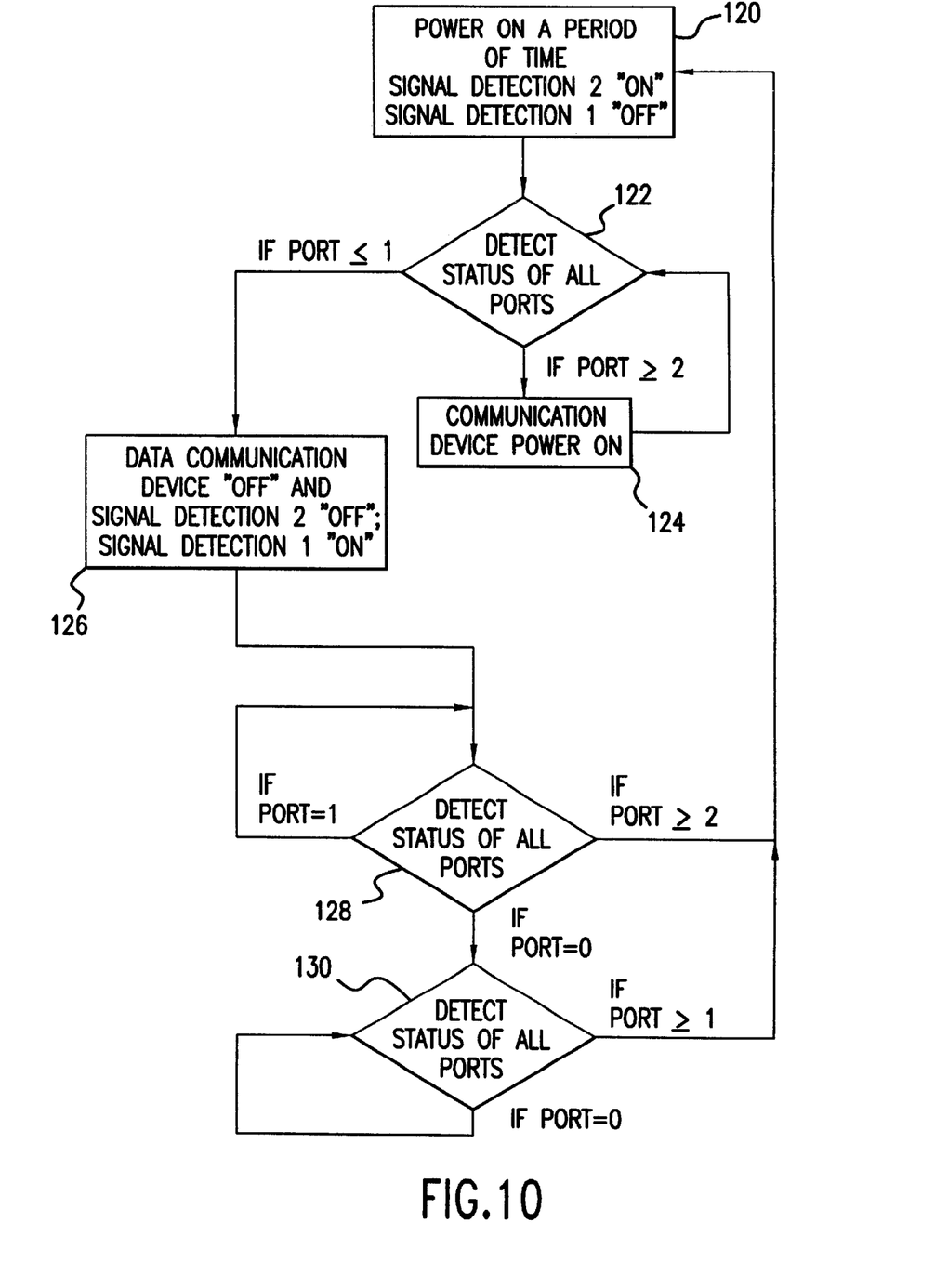
FIG. 10 is a flow-chart illustrating the operation of the power shut-off and recovery circuit of FIGS. 8 and 9.

Thus, in the embodiment of FIGS. 8–10, the second signal detection circuit 112 is used to couple or provide the LINK signals to the power control circuit 30e to indicate the status of the ports 40e when the communication device 14e is turned on. As a result, when the second signal detection circuit 112 is in use, the first signal detection circuit 110 can be turned off, so that the RX signals are not sampled by the power shut-off and recovery circuit 10e. This ensures that the quality of the RX signals will not be compromised by the operation of the power shut-off and recovery circuit 10e. When the communication device 14e is turned off, the LINK signals will not be generated, so the first signal detection circuit 110 is used to sample the RX signals from the data terminals DT.

The operation of the power shut-off and recovery circuit 10e of FIGS. 8 and 9 is now described in connection with the flowchart of FIG. 10. The power control circuit 30e controls the operation of the circuit 10e, and is continuously powered by the voltage source Vcc (see FIG. 8), so it can be programmed to detect the status of the ports 40e, either on a continuous or a periodic basis, and to determine whether the communication device 14e should be turned on or off. Referring to FIG. 10, in step 120, the power control circuit 30e provides power to the communication device 14e to turn it on for a period of time, and also provides power to the second signal detection circuit 112 to turn it on. During this step, the first signal detection circuit 110 is in the "off" state. As explained above, the power control circuit 30e controls the "on" and "off" status of the communication device 14e, the first signal detection circuit 110 and the second signal detection circuit 112 by transmitting the ENABLE signal to the source transfer circuit 34e that selectively couples or decouples the power source Vcc to the communication device 14e, the first signal detection circuit 110, and the second signal detection circuit 112, or by its control of the BE signals to the MUX 18e. Step 120 can generally be considered the "normal operation" mode of the network system where there are two or more users (or data terminals DT) using the network.

Thereafter, in step 122, the status of all the ports 40 is checked. Since the second signal detection circuit 112 is in use, the LINK signals from the MAC 100 and/or the PHY 102 are latched by the latches 114 in the second signal detection circuit 112 and provided in parallel to the power control circuit 30e.

After all the ports 40 have been polled, the power control circuit 30e determines the number of ports 40e that are in the operational mode. If it is determined that the number of active ports 40e is two or more, then in step 124, the power control circuit 30e continues to assert the ENABLE signal that causes the source transfer circuit 34e to provide power to the communication device 14e, and processing returns to step 122 to check the status of the ports 40e again (via the second signal detection circuit 112). However, if the number of active ports 40e is either one or zero, then in step 126, the power control circuit 30e of the present invention de-asserts (i.e., turns off) the ENABLE signal which causes the source transfer circuit 34e to disengage the communication device 14e from the power source Vcc. In addition, the second signal detection circuit 112 is turned off, and the first signal detection circuit 110 is turned on. Since the number of users in the network is either zero or one, there is probably little or no communication between the data terminals DT and the communication device 14e, so the RX signals can be directly polled or sampled without fear of compromising the quality of these RX signals.

Processing then proceeds to step 128 to check the status of the ports 40e again. Since the first signal detection circuit 110 is now in use, the RX signals are received by the first signal detection circuit 110 in the manner described above in connection with FIGS. 3–7, and subsequently provided to the power control circuit 30e. The status of the ports 40e can be checked again immediately, or after a predetermined time period. If it is now determined that at least two ports 40e are active, then processing returns to step 120. If it is now determined that only one port 40e is active, then processing returns to step 128. However, if it is now determined that there are no active ports 40e, then processing proceeds to step 130, where the status of the ports 40e are checked again (via the first signal detection circuit 110). In step 130, if it is now determined that at least one port 40e is active, then processing returns to step 120 since this is an indication that at least one new user has logged on to the network. However, if it is determined that there are still no active ports 40e, then processing returns to step 130. It is noted that the communication device 14e and the second signal detection circuit 112 are maintained in the "off" state during steps 128 and 130, with the polling of the ports 40e being done using the RX signals and the first signal detection circuit 110.

The embodiment illustrated in FIGS. 8–9 can be further modified to include several alternatives. For example, the second signal detection circuit 112 can be omitted and the LINK signals can be coupled directly to the power control circuit 30e. As another example, multiplexers (such as 18a and 18b) and latch circuits (such as 26a and 26c) can also be provided in the second signal detection circuit 112 and used in same manners as described above in FIGS. 3–6.

Thus, the present invention provides power shut-off and recovery circuits 10 that operate to shut off the communication device 14 whenever there is no need to have it on. The power shut-off and recovery circuits 10 further operate to monitor the status of the ports 40 either continuously or periodically, and to turn the communication device 14 on again if there are sufficient users in the network. The shut-off of the communication device 14 when it is not in use conserves energy and increases the operation life of the communication device 14. The present invention further provides different techniques and structures for sampling or polling the status of the ports 40.

Although certain components, subsystems, and blocks have been described above as including certain elements, it will be appreciated by those skilled in the art that such disclosures are non-limiting, and that different elements, or combinations thereof, can be provided for such components, subsystems, and blocks without departing from the spirit and scope of the present invention.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A data communication network, comprising:
    a first communication device, the first communication device having a plurality of ports, a control coupled to the plurality of ports and having a plurality of outputs extending from the control, with each of the plurality of outputs indicative of the status of one of the plurality of ports;
    a power shut-off and recovery circuit coupled to the first communication device, said power shut-off and recovery circuit having:
        (i) a first signal detection circuit coupled to the plurality of ports for detecting activity on each port and for generating a first signal indicative of the activity;
        (ii) a second signal detection circuit coupled to the plurality of outputs for detecting activity on each port and for generating a second signal indicative of the activity;
        (iii) a power control circuit, coupled to the first and second signal detection circuits, for receiving the first and second signals, respectively, and for selectively asserting an ENABLE signal based on either the first signal or the second signal; and (iv) a source transfer circuit, coupled to receive the ENABLE signal, for selectively disengaging a power source from the communication device.

2. The network of claim 1, wherein the first signal detection circuit is turned off, and the second signal detection circuit is turned on, when the number of active ports exceeds a predetermined threshold.

3. The network of claim 2, wherein the second signal detection circuit is turned off, and the first signal detection circuit is turned on, when the number of active ports is less than a predetermined threshold.

4. The network of claim 1, wherein the power shut-off and recovery circuit includes a latch circuit having a clock input coupled to receive the first signal and responsive thereto for generating a third signal representative of the first signal, and for transmitting the third signal to the power control circuit.

5. The network of claim 4, wherein the power shut-off and recovery circuit includes a plurality of first signal detection circuits, and a plurality of latch circuits, wherein each port is coupled to a respective first signal detection circuit and respective latch circuit, and the power control circuit is coupled to the plurality of latch circuits and determines the number of ports that are active.

6. The network of claim 1, wherein the power shut-off and recovery circuit includes a plurality of first signal detection circuits, wherein each port is coupled to a respective first signal detection circuit, and the power control circuit is coupled to the plurality of first signal detection circuits and determines the number of ports that are active.

7. The network of claim 1, wherein the first signal detection circuit comprises an amplifier.

8. The network of claim 4, wherein the latch circuit includes a D-type flip-flop.

9. The network of claim 1, wherein the communication device may be selected from the group consisting of: a collecting tray, a multiple coupling port installation, a switch, and a router.

10. The network of claim 1, wherein the source transfer circuit includes a power transistor having a gate electrode coupled to the power control circuit for receiving the ENABLE signal, a drain electrode coupled to receive a power voltage, and a source electrode coupled to the data communication device, the first signal detection circuit and the second signal detection circuit.

11. The network of claim 1, wherein the source transfer circuit comprises a relay.

12. The network of claim 1, wherein the first signal detection circuit includes a multiplexer coupled between the plurality of ports and the power control circuit to selectively connect the plurality of ports to the first signal detection circuit.

13. The network of claim 12, wherein the multiplexer comprises a plurality of pass transistors, each pass transistor having a first electrode coupled to a respective port, a second electrode coupled to the power control circuit, and a third electrode for receiving a control signal from the power control circuit, wherein the first and second electrode form a signal path which is electrically conductive based on the control signal.

14. The network of claim 12, wherein the first signal detection circuit includes a latch circuit having a clock input coupled to receive the first signal and responsive thereto for generating a third signal representative of the first signal, and for transmitting the third signal to the power control circuit.

15. The network of claim 1, wherein the second signal detection circuit comprises a plurality of latches.

16. The network of claim 1, wherein the control of the communication device includes a physical layer device coupled to the plurality of ports, and a media access control coupled to the physical layer device, with the plurality of outputs extending from the physical layer device and/or the media access control.

17. The network of claim 16, wherein the plurality of outputs are also coupled to a display to indicate the status of activity of the plurality of ports.

18. The network of claim 3, wherein the first signal detection circuit and the second signal detection circuit are turned on and off based on the ENABLE signal.

19. A method of monitoring the status of a plurality of ports of a communication device, and for shutting off the communication device, comprising the steps of:

a. providing a first communication device having a plurality of ports, a control coupled to the plurality of ports and having a plurality of outputs extending from the control, with each of the plurality of outputs indicative of the status of one of the plurality of ports;

b. coupling the plurality of ports to a first signal detection circuit;

c. coupling the plurality of outputs to a second signal detection circuit;

d. detecting the presence of a signal from each of the plurality of ports via the plurality of outputs and the second signal detection circuit;

e. determining the number of signals received from the plurality of outputs;

f. turning off the communication device if the number of signals received from the plurality of outputs is smaller than a predetermined number;

g. detecting the presence of a signal from each of the plurality of ports via the first signal detection circuit;

h. determining the number of signals received from the plurality of ports; and i. turning on the communication device if the number of signals received from the plurality of ports is greater than a predetermined number.

20. The method of claim 19, wherein step (d) further includes the step of:

turning off the first signal detection circuit.

21. The method of claim 19, wherein step (f) further includes the step of:

(f1) turning off the second signal detection circuit; and
(f2) turning on the first signal detection circuit.

22. The method of claim 19, wherein step (i) further includes the step of:

(i1) turning off the first signal detection circuit; and
(i2) turning on the second signal detection circuit.

* * * * *